Figure 1:
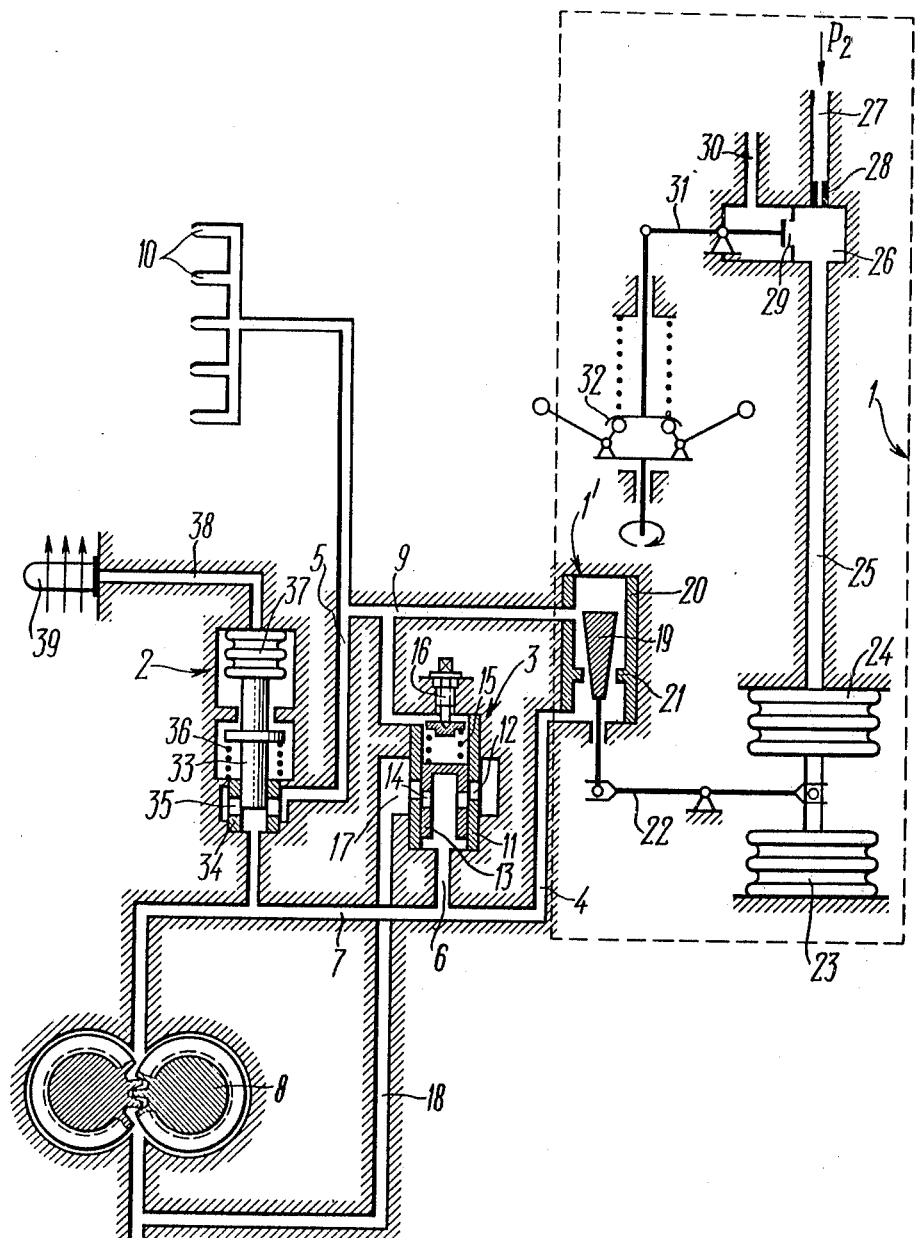

United States Patent [19]

Dmitriev et al.

[11] 4,034,559
[45] July 12, 1977

[54] FUEL FEED CONTROL IN A GAS-TURBINE ENGINE

[76] Inventors: Vasily Petrovich Dmitriev, ulitsa Kalinina, 10, kv. 20; Andrei Alexandrovich Luzhin, ulitsa Kalinina, 22/36, kv. 18; Anatoly Mikhailovich Polyakov, ulitsa Gorkogo, 35, kv. 6; Alexandr Grigorievich Tomilin, ulitsa Kalinina, 28, kv. 22; Stanislav Mikhailovich Shushpan, ulitsa Pushkina, 27/28, kv. 8, all of Stupino Moskovskoi oblasti, U.S.S.R.

[21] Appl. No.: 636,949

[22] Filed: Dec. 2, 1975

[51] Int. Cl.$^2$ .......................................... F02C 9/10
[52] U.S. Cl. ...................... 60/39.28 R; 60/39.28 T
[58] Field of Search ............... 60/39.28 R, 39.28 T

[56] References Cited

U.S. PATENT DOCUMENTS

| | | | |
|---|---|---|---|
| 3,267,670 | 8/1966 | McCombs | 60/39.28 R |
| 3,306,037 | 2/1967 | Fortmann | 60/39.28 R |
| 3,390,522 | 7/1968 | Whitehead | 60/39.28 R |
| 3,514,946 | 6/1970 | Warne | 60/39.28 R |
| 3,713,290 | 1/1973 | Gold | 60/39.28 R |
| 3,777,480 | 12/1973 | Stoltman | 60/39.28 R |

*Primary Examiner*—Clarence R. Gordon

[57] ABSTRACT

A fuel feed control comprising a device for a metered fuel supply to the combustion chamber of a gas-turbine engine, a valve to maintain a preset fuel pressure differential across the actuator element of the metering device, and a corrector of the rate of fuel feed to the combustion chamber depending upon the ambient air temperature. The actuator element, corrector and valve are mounted in respective parallel passageways which connect the fuel pump with the combustion chamber of the gas-turbine engine.

5 Claims, 2 Drawing Figures

FUEL FEED CONTROL IN A GAS-TURBINE ENGINE

This invention relates to control of the parameters of a gas-turbine engine and has particular reference to fuel feed controls of a gas-turbine engine.

Known are fuel feed controls on gas-turbine engines adapted to vary the rate of fuel feed depending upon the ambient air temperature by changing the amount of air pressure effective from the final compressor stage that controls the metering device of the fuel feed control.

One prior-art fuel feed control (cf. British Pat. No. 1,023,767 Cl. G3p) is known to comprise a metering device, a valve adapted to maintain a preset fuel pressure differential across said metering device, and a corrector of fuel supply to suit the ambient air temperature. The metering device comprises a spool mounted in a fixed sleeve. The sleeve and spool are provided with metering ports, while the spool communicates with a diaphragm provided in the chamber.

This diaphragm subdivides the chamber into two spaces, that is, the bottom and top ones. The bottom space is communicated through a pipeline with the inlet of gas-turbine engine compressor, whereas connected to the top space are two pipelines of which one communicates the top space with the final stage of the gas-turbine engine compressor, while the other pipeline communicates the top space with the corrector of fuel supply depending upon the ambient air temperature.

The fuel supply corrector comprises a temperature sensor linked with a lever-operated valve adapted to shut up the port in the corrector seat. Air is fed to said port along an air duct from the pipeline communicating the corrector with the top space of the metering device chamber. The temperature sensor comprises a bottle communicated through a pipeline to bellows which are interconnected with the valve through a rod. Both the bottle and the bellows are filled with a liquid possessing high temperature expansion factor.

The valve maintaining a preset differential of fuel pressure across the spool of the metering device has a spool mounted in a fixed sleeve and loaded with a spring whose one end rests against the spool and the other end, against the screw for adjusting the valve for a preset amount of fuel pressure differential.

The spool of the metering device and the valve maintaining a preset pressure differential across said spool are mounted in parallel passageways intercommunicating the fuel pump with the fuel injectors of the gas-turbine engine combustion chamber. Additionally, one more passageway communicates the valve excess fuel space with the inlet of the fuel pump.

When accelerating, the gas-turbine engine fuel metering is effected through the metering ports in the spool of the metering device. With the gas-turbine engine accelerated, air pressure past the final stage of said engine rises, accordingly, which is accompanied by a corresponding raise of pressure in the top space of the metering device chamber. Such a pressure raise increases the force applied to the diaphragm of that chamber from its top space. As a result the diaphragm deflects and displaces the spool, thus increasing the flow passage area of the spool metering ports and hence the rate of flow therethrough.

The fuel pressure differential across the spool of the metering device is maintained constant at acceleration of the gas-turbine engine by means of the valve adapted to keep a preset fuel pressure differential. A drop of the fuel pressure differential across the spool of the metering device causes a corresponding drop of the fuel pressure differential across the valve spool. The valve spring that counteracts the force developed by the fuel pressure differential across the spool is released and causes the valve spool to displace. This reduces the flow passage area of the spool ports and, consequently, the amount of excess fuel fed through said ports along the additional passageway to the inlet of the fuel pump. Said reduction in the amount of excess fuel fed through the valve leads to a rise of the fuel pressure differential across the spool of said valve. The above-described process continues until the fuel pressure differential across the spool of the metering device reaches the preset level.

When the fuel pressure differential across the spool of the metering device rises, the force developed by the pressure differential across the valve spool overcomes the tension of the valve spring, with the result that the valve spool is displaced, thus increasing the flow passage area of the spool ports. This in turn increases the amount of excess fuel fed through said metering ports into the fuel pump, whereby the fuel pressure differential across the valve spool drops down to a preset value.

The fuel supply corrector (also referred to commonly as an excess fuel device) operates as follows. When the ambient air temperature varies, say, increases the liquid filling the bottle and bellows of the temperature sensor, is liable to expand, the bellows extends to displace the rod of the temperature sensor, the rod causes the lever-operated valve to turn around its own axis which results in an increased valve-to-seat clearance. This in turn leads to high rate of air flow through the valve. The air pressure effective in the top space of the metering device chamber drops, the diaphragm deflects to displace the spool of that device. On account of a reduced flow passage area of the metering ports, the rate of fuel flow through the metering device becomes lower. When the ambient air temperature drops the liquid in the temperature sensor contracts, and the bellows, while acting through the rod causes the valve to turn so as to reduce the valve-to-seat clearance. This results in a lower rate of air flow through the valve and increased air pressure in the top space of the metering device chamber. Thus, the rate of fuel flow through the metering device increases accordingly.

The above-discussed fuel feed control suffers from the disadvantage that the amount by which the rate of fuel flow varies in response to alteration of the ambient air temperature, is a variable quantity under acceleration conditions of a gas-turbine engine, so that with an increase in the speed of the turbocompressor of the gas-turbine engine said amount of variation of the fuel flow rate steps up too. The result is that at the beginning of acceleration of the gas-turbine engine, said ambient-temperature dependent amount of variation of the fuel flow rate proves inadequate for a reliable starting and acceleration of the engine, whereas at the end of the acceleration process too high variations of the fuel flow rate badly affect the gas-dynamic stability of the engine.

Known in the prior art are also fuel feed controls of a gas-turbine engine capable of varying the rate of fuel feed in response to the ambient air temperature by changing the fuel pressure differential across the fuel metering device thereof. One prior-art fuel feed control (cf. Swiss Pat. No. 379,840 Cl.46g, 2/03, 1964) is known to comprise a metering device, a valve adapted to maintain a certain fuel pressure differential across the metering device, and a corrector of fuel supply depending on the temperature of the ambient air.

The fuel metering device is disposed in the pipeline communicating the fuel pump with the fuel injectors of the gas-turbine engine combustion chamber. The device comprises a spool mounted in a rotary sleeve which in turn is seated in a fixed sleeve. The spool is connected with a cam set on a shaft interconnected by a gear rack to a speed transmitter of the engine turbocompressor. The rotary sleeve has fuel metering ports and is connected to the atmospheric pressure pickup. The fixed sleeve is likewise provided with metering ports.

The valve adapted to maintain a definite fuel pressure differential across the metering device, comprises a spool interconnected with a diaphragm enclosed in the chamber to divide it into two subchambers.

The bottom subchamber is communicated through a passageway with the pipeline running from the fuel pump to the fuel metering device, while the top subchamber is passageway-communicated with the pipeline running from the metering device to the fuel injectors of the combustion chamber, said passageway mounting the corrector of fuel supply depending upon the ambient air temperature. The valve spool is mounted in the passageway communicating the fuel pump-to-metering device pipeline with the fuel pump inlet.

The fuel supply corrector has a spool communicated with the temperature sensor. The latter comprises a bottle and bellows interconnected through a pipeline. Both the bottle and bellows are filled with a liquid featuring high thermal expansion factor.

When accelerating the engine, the rate of fuel feed as governed by the feed control, depends upon the flow passage area of both sleeves and the spool of the metering device, and upon the fuel pressure differential across said elements of the metering device. In turn, the flow passage area of the metering device is the function of the mutual position of the spool and sleeves. As the engine gains speed when is being accelerated, this causes the shaft of the speed transmitter to turn and the cam on which the spool rests, to change its position. As a result, the spool is displaced so as to increase the flow passage area of the metering device, whereby the rate of fuel flow therethrough is increased accordingly.

Atmospheric pressure variation causes the rotary sleeve to turn, thus altering the flow passage area of the ports of the metering device and hence varying the rate of fuel flow therethrough.

Fuel pressure differential across the metering device is maintained constant (at an invariable ambient air temperature) with the use of the valve maintaining a definite fuel pressure differential across the metering device. Any departure of the amount of the fuel pressure differential across the metering device from a preset one, say, towards an increase, results in a higher fuel pressure differential across the diaphragm. As a result, the diaphragm is deflected and displaces the valve spool interconnected therewith. The result is an increase in the flow passage area of the passageway communicating the pump-to-metering device pipeline with the fuel pump inlet. This, in turn, increases the amount of fuel flow along the pipeline communicating the pump with the metering device and along said passageway to the pump inlet and reduces the fuel pressure differential across the metering device. The above-considered process takes place until the fuel pressure differential across the metering device reaches a preset level.

When the fuel pressure differential across the metering device becomes lower than a preset valve, the fuel pressure differential across the diaphragm also decreases. As a result, the diaphragm causes the valve spool connected thereto to displace so as to reduce the flow passage area of the passageway communicated with the pump-to-metering device pipeline. This leads to an increased fuel pressure differential across the metering device.

In response to a drop of the atmospheric air temperature, the liquid in the temperature sensor contracts, and the bellows of the sensor also contracts, thus causing the fuel supply corrector spool to displace so as to enlarge the flow passage area of the passageway intercommunicating the top space of the valve with the pipeline running from the metering device to the fuel injectors of the combustion chamber.

This causes the pressure in the top space of the chamber to rise, whereby the diaphragm along with the valve spool is made to displace into the position, wherein the amount of fuel supplied through the valve is reduced and, consequently, an increase of the fuel pressure differential across the metering device is developed. This increase of the differential pressure across the metering device leads to an increased rate of fuel flow therethrough.

In response to an ambient temperature increases the volume of the liquid contained in the temperature sensor of the fuel supply corrector is increased, whereby the bellows extends to displace the spool and thus reduce the flow passage area of the passageway it controls. The pressure in the top space of the valve pressure differential chamber drops accordingly. The diaphragm along with the valve spool is displaced to the position, wherein the amount of fuel fed is increased and, consequently, the fuel pressure differential across the metering device also increases. This leads to a reduced of fuel flow through the metering device.

However, the afore-stated fuel feed control of a gas-turbine engine suffers from the disadvantages inherent in the former fuel feed control discussed earlier. The amount of the fuel flow rate variation in response to a change in the atmospheric temperature, is likewise a variable quantity under acceleration conditions of the gas-turbine engine. This renders the engine starting unreliable and reduces engine gas-dynamic stability during its acceleration.

It is a primary object of the present invention to provide a fuel feed control which ensures a reliable starting of a gas-turbine engine regardless of atmospheric air temperature.

It is another object of the present invention to provide such a fuel feed control that leads to a higher margin of gas-dynamic stability of the engine.

The above and other objects are accomplished due to the fact that in a fuel feed control of a gas-turbine engine, comprising a device for metered fuel feed to the combustion chamber, a valve to maintain a preset pressure differential effective across the actuator element of said metering device, and a corrector of the rate of fuel flow to the combustion chamber depending upon the ambient air temperature, all the abovesaid components are arranged in passageways communicating the fuel pump with the combustion chamber of said gas-turbine engine, and according to the invention, said fuel supply corrector is mounted parallel with said valve, whereby a constant rate of fuel flow through said corrector is ensured at a given temperature of the ambient air.

The herein-proposed fuel feed control provides for an equidistant variation of the rate of fuel flow in a gas-turbine engine in response to ambient temperature changes.

At the beginning stage of the engine starting, this provides a fuel flow rate sufficient for a reliable engine starting at any ambient air temperature.

At the final stage of the engine starting the proposed fuel feed control ensures a rate of fuel flow adequate enough to provide the required gas-dynamic stability margin of the engine.

Figure 2:
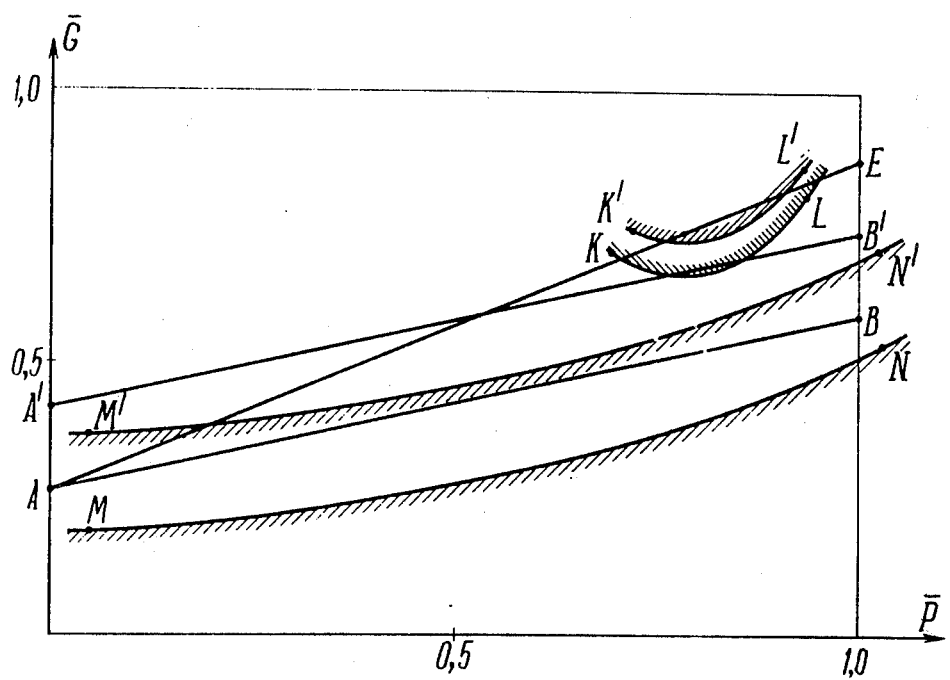

Other objects and advantages of the present invention will become more evident from consideration of the detailed disclosure of an exemplary embodiment thereof which follows hereinbelow in conjuction with the accompanying drawings, wherein:

FIG. 1 illustrates a schematic diagram of a fuel feed control in a gas-turbine; and FIG. 2 shows a comparative graphic representation of the rate of fuel flow as metered by one prior-art fuel feed control and by the herein-proposed control, versus the pressure intensity past the final stage of the compressor of a gas-turbine engine when the latter is being accelerated.

The fuel feed control (FIG. 1) comprises a device 1 for a metered fuel feed to the combustion chamber of the gas-turbine engine (not shown), said device having an actuator element 1', a corrector 2 of the rate of fuel flow depending upon the ambient air temperature, and a valve 3 to maintain a constant effective fuel pressure differential across the aforesaid actuator element 1' and the corrector 2. Said actuator element 1', valve 3 and corrector 2 are located in three parallel passageways 4, 5, 6 respectively, which communicate a pipeline 7 of fuel supply from a pump 8 with a pipeline 9 of fuel supply to injectors 10 of the combustion chamber of the gas-turbine engine (not shown).

The valve 3 comprises a sleeve 11 with metering ports 12, said sleeve accommodating a spool 13 with metering ports 14, said spool being loaded by a spring 15. The spring has one end which rests upon a screw 16 to adjust the valve 3 for a definite amount of fuel pressure differential across the actuator element 1' and the corrector 2, while the other end of the spring 15 rests upon the spool 13. An excess fuel chamber 17 of the valve 3 is communicated through a passageway 18 with the inlet of the fuel pump 8.

The actuator element 1' of the metering device 1 comprises a spool 19 sliding in a sleeve 20. The amount of travel of the spool 19 determines the flow passage area of a clear space 21 defined between the spool 19 and the sleeve 20. The spool 19 is interconnected through a lever 22 to bellows 23 and 24 of which the former is air-evacuated, while the latter is communicated through a passageway 25 to a chamber 26 whereinto air is fed from the final stage of the compressor of the engine (not shown) along a pipeline 27 and an air bleed 28. The chamber 26 communicates with atmosphere through a port 29 and a pipeline 30. The flow passage area of the port 29 depends upon the position of a lever-operated valve 31 which is interconnected to a centrifugal transmitter 32 of the speed of the turbocompressor of the engine The corrector 2 of the rate of fuel flow depending upon the ambient air temperature has a spool 33 accommodated in a sleeve 34 provided with metering ports 35.

The spool 33 bears at one end upon a spring 36, and at the other end, on bellows 37 which is communicated through a pipeline 38 to a temperature sensor 39. The latter is constituted essentially as a bottle filled with a liquid having a high thermal expansion factor. The same liquid fills the bellows 37 and the pipeline 38.

The fuel feed control of the present invention operates as follows (under acceleration conditions of a gas-turbine engine). Fuel is fed by the pump 8 to the pipeline 7, from whence it flows through the passageways 4 and 5 to the pipeline 9 and, finally, to the injectors 10. The rate of fuel flow through the passageways 4 and 5 depends on the flow passage area of the clearance space 21 and that of the ports 35 of the fuel supply corrector 2, as well as on the fuel pressure differential across the spools 19 and 33.

The fuel pressure differential across the spools 19 and 33 is maintained constant by means of the valve 3. In the initial position when the fuel pressure differential across the spool 13 equals a preset level, the spool 13 is in a state of equilibrium, which is due to the effect of the tension of the spring 15 applied to one end of the spool, and the force of the fuel pressure differential across the spool, applied to the other end thereof. Part of the fuel fed along the pipeline 7 is supplied to the inlet pump 8 through the flow passage of the metering ports whose area depends upon the position of the spool 13 in the sleeve 11, the excess fuel chamber 17 and the passageway 18.

When the magnitude of the fuel pressure differential across the spools 19 and 33 departs from a preset valve, which is the case due to, say, to changed acceleration parameters of the engine, the valve 3 functions as follows. An increase in the fuel pressure differential across the spools 19 and 33 causes a corresponding increase in the fuel pressure differential across the spool 13 of the valve 3.

As a result, the force of the fuel pressure differential across the spool 13 gets higher; under the effect of said force the spool 13, while overcoming the tension of the spring 15, starts displacing, which results in a higher area of the flow passage of the metering ports 12. Thus, the amount of fuel fed along the pipeline 7 through the metering ports 12, the excess fuel chamber 17 and the passageway 18 to the inlet of the pump 8 is increased. This results in a drop of the fuel pressure effective in the pipeline 7 and, hence in a drop of the fuel pressure differential across the spool 19 of the metering device 1 and across the spool 33 of the fuel supply corrector 2. This control process continues until the fuel pressure differential across the spools 19 and 33 becomes equal to a preset level.

A reduced fuel pressure differential across the spools 19 and 33 produces a corresponding drop of the pressure differential across the spool 13 of the valve 3. The force developed by the fuel pressure differential across the spool 13 is diminished, and the spring 15 causes the spool 13 to displace, thus reducing the flow passage area of the metering ports 12. As a result, the amount of fuel fed along the pipeline 7 through the metering ports 12, the excess fuel chamber 17 and the passageway 18 to the inlet of the pump 8 is decreased. This leads to increase of the fuel pressure effective in the pipeline 7 and, consequently, to an increased fuel pressure differential across the spools 19 and 33. This control process does not cease not until the fuel pressure differential across the spools 19 and 33 reaches a preset level.

The flow passage area of the clearance space 21 depends upon the mutual position of the spool 19 and the sleeve 20. At the initial period of engine acceleration the spool 19 assumes such a position with respect to the sleeve 20 that corresponds to the amount of fuel passing through the clearance space 21, required for starting the engine. With further acceleration of the engine, the air pressure effective past the final stage of the engine compressor rises and hence occurs in the chamber 26 and the bellows 24. The latter is made to extend and while acting through the lever 22, causes the spool 19 to displace. This enlarges the flow passage area of the clearance space 21 and increases the rate of fuel flow from the pipeline 7 through the clearance space 21, the pipeline 9 and the injectors 10 to the engine combustion chambers. Such an increase in the fuel flow rate results in further acceleration of the engine.

Upon reaching the speed close to a idle-run speed, the centrifugal speed transmitter 32 acts upon the valve 31 to increase the flow passage area of the port 29. Thereby the amount of the air bleed into the atmosphere from the chamber 26 through the port 29 and the pipeline 30 is increased. The air pressure effective in the chamber 26 and the bellows 24 drops accordingly. The air bleed 28 throttles the pressure of the air supplied along the pipeline 27 from the engine compressor, thus reducing the air pressure in the chamber 26 and the bellows 24 upon enlarging the flow passage area of the port 29. In addition, the air bleed 28 lowers air pressure fluctuation in the chamber 26 and the bellows 24.

As a result, the bellows 24 contracts and while acting through the lever 22 causes the spool 19 to displace. The displacement of the spool 19 reduces the flow passage area of the clearance space 21 of the metering device 1 and, respectively, decreasing the flow rate of fuel fed through the clearance space 21 to the injectors 10 of the combustion chamber of the gas-turbine engine. Such a drop of the fuel flow rate occurs until the rate of flow through the injectors 10 of the combustion chamber becomes equal to that required for the engine to run at idle.

Fuel metering through the fuel supply corrector 2 occurs as follows. The flow passage area of the ports 35 of the sleeve 34 of the corrector 2 depends upon the position of the spool 33 with respect to the sleeve 34. In the initial position the spool 33 is in a state of equilibrium due to being acted upon by the tension of the spring 36 and by the force of the bellows 37. An increase in the ambient air temperature makes the liquid filling the temperature sensor 39 and the bellows 37 expand, with the result that the latter extends and, while counteracting the tension of the spring 36 causes the spool 33 to displace and reduce the flow passage area of the ports 35 of the sleeve 34, thus decreasing the rate of fuel flow along the pipeline 7 through the metering ports 35, the pipeline 5 and the injectors 10 to the engine combustion chamber.

When the ambient air temperature drops, the liquid filling the temperature sensor 39 and the bellows 37, contracts. The bellows 37 contracts likewise, and the spring 36 urges the spool 33 to displace and enlarge the flow passage area of the ports 35 and, consequently, to increase the rate of fuel flow along the pipeline 7 through the metering ports 35, the pipeline 5 and the injectors 10 to the combustion chamber of the engine (not shown).

Inasmuch as the fuel pressure differential across the spool 33 of the corrector 2 is maintained constant, the rate of fuel flow through the corrector 2 at any given temperature of ambient air is kept constant within the entire engine acceleration procedure.

FIG. 2 illustrates a comparative graphic representation of the rate of fuel flow of a gas-turbine engine as metered by one prior-art fuel feed control and by the herein-proposed one. Plotted against the axis in one of the parameters characteristic of the engine acceleration, such as air pressure P effective past the final stage of the engine compressor, while plotted on the ordinate axis is the rate of fuel flow as metered by the fuel feed control. The following curves are presented on the chart:

A-B denotes the amount of fuel as metered by both fuel feed controls at the same ambient air temperature (e.g., at +50° C) during engine acceleration;

A-E denotes the amount of fuel as metered by the prior-art fuel feed control in response to a drop of the ambient air temperature (e.g., at −50° C);

A'-B' denotes the amount of fuel as metered by the proposed fuel feed control in response to a drop of the ambient air temperature (e.g., at −50° C);

K-L denotes the lower gas-dynamic stability limit of the engine being accelerated (at +50° C);

K'-L' denotes the upper gas-dynamic stability limit of the engine being accelerated (at −50° C);

M-N is the curve corresponding to such an engine rating at which the power developed by the turbine equals that required for driving the compressor of the gas-turbine engine at +50° C;

M'-N' is the curve corresponding to the engine rating at which the power developed by the turbine equals that required for driving the compressor of the gas-turbine engine at −50° C.

The above-described chart gives a graphic demonstration of the fact that the prior-art fuel feed control fails to provide a reliable engine starting and acceleration when the environmental temperature conditions vary. At the initial acceleration stage the variation of the rate of fuel flow depending upon the ambient air temperature is inadequate.

When such is the case at low ambient temperatures, it might result in the condition in which the amount of fuel as metered by the fuel feed control happens to be inadequate for engine starting, while at elevated temperatures it might lead to the condition in which the temperature of the gas mixture in the combustion chamber exceeds the permissible one due to excess fuel metered by the fuel feed control. This might lead to failure of the engine combustion chamber.

On the other hand wide-range variation of the rate of fuel flow in response to changes of the ambient air temperature at the end of the engine acceleration might cause, at low ambient air temperatures, the engine to fall within the zone of gas-dynamic instability due to an abnormally high rate of fuel flow as metered by the fuel feed control. At elevated ambient temperatures, the amount of fuel metered by the fuel feed control might prove to be inadequate for starting the engine at the end of acceleration thereof.

The fuel feed control as proposed in the present invention is not subject to the aforesaid disadvantages, since it provides for a constant rate of fuel flow through the fuel supply corrector at any given temperature of ambient air, which ensures an adequate rate of fuel flow at the beginning of acceleration and the required margin of the engine gas-dynamic stability at the end of its starting.

What we claim is:

1. In a combination of a fuel feed control with a gas-turbine engine whose combustion chamber is communicated through passageways with the fuel pump, said fuel feed control comprising: a device for a metered fuel feed to said combustion chamber; an actuator element of said fuel feed control, through which said fuel metering is effected; a valve adapted to maintain a preset fuel pressure differential across said actuator element; a corrector of the rate of fuel feed to said combustion chamber depending upon ambient air temperature, an improvement in which provision is made for three parallel passageways, and said actuator element, said valve and said fuel supply corrector are each mounted in one of the said passageways.

2. The improvement as claimed in claim 1 wherein said fuel feed control actuator element comprises an engine output pressure sensing means and an engine velocity sensing means.

3. The improvement as claimed in claim 2 comprising a pressure transducer coupled to said velocity sensing means to supply a pressure parameter to said pressure sensing means.

4. The improvement as claimed in claim 1 wherein the temperature sensitive corrector comprises an ambient air temperature sensor and valve means coupled to said corrector for regulating the flow in the associated passageway in relation to the ambient air temperature.

5. The improvement as claimed in claim 4 wherein said temperature sensitive corrector includes a liquid in a container, said liquid having a high thermal expansion factor.

* * * * *